United States Patent Office 3,454,415
Patented July 8, 1969

3,454,415
PROCESS FOR THE MANUFACTURE OF AN ELECTROPHOTOGRAPHIC MATERIAL
Georges Auguste Bonjour, Bron, France, assignor to Societe Lumiere, Paris, France, a French company
No Drawing. Filed May 24, 1965, Ser. No. 458,427
Claims priority, application Switzerland, May 25, 1964, 6,788/64
Int. Cl. G03c 1/06
U.S. Cl. 117—34     8 Claims

ABSTRACT OF THE DISCLOSURE

A process for the manufacture of electrophotographic material that is permanently insensitive to moisture by coating a support with a resin layer containing a photoconductor and fixing the resin layer, wherein a photoconductor is added to an aqueous preparation obtained by dissolving in water a salt of a copolymer containing carboxyl groups and a volatile nitrogen base, and the mixture reacted with a compound of hexavalent chromium, the preparation applied to a support and the support thus treated is dried.

---

The present invention relates to a process for the manufacture of an electrophotographic material.

It is known that electrophotographic layers can be manufactured by dispersing an inorganic or organic photoconductor (that is to say a compound capable of becoming an electrical conducter under the influence of light), for example, zinc oxide, in a resin capable of forming a connecting layer that does not conduct electricity. Such a layer, applied to a support, can be given a negative charge in the dark, for example, by a corona discharge. When this layer is exposed to light under a master, the exposed areas are discharged, whereupon the unexposed areas can be rendered visible by sprinkling on to them an insulating powder than can be positively charged, because the powder particles are attracted in the areas carrying a negative charge and an image results which can be fixed in a variety of ways, for example, by melting the powder or spraying with a lacquer.

In the most commonly employed method for the manufacture of electrophotographic layers, a resin is used in solution in an organic solvent. The photoconductor is dispersed in this binder, a support, for example, paper or film, is coated with the mixture and the solvent is evaporated. This procedure furnishes an insulating layer that is insensitive to moisture. This property is essential in order to ensure that the electric properties of the layer are not impaired by the moisture content of the surroundings. The removal and recovery of the organic solvents needs special apparatus, therefore this method is cumbersome and costly.

A method is also known where organic solvents are dispensed with, and binders containing acid groups and volatile bases are used, and after having been applied to the support, the bases are removed by heating. This method produces a water-insoluble layer, but it is very sensitive to moisture. If it is attempted to push the reaction of the binder containing acid groups with the volatile base further by intensified heating, water is eliminated and an anhydride is formed, and the layer is at first insensitive to moisture, as was desired. The reaction to eliminate water is, however, at least partially reversible, and after some time the layer will have reabsorbed so much water from the air that its favorable properties are lost.

The afore-mentioned disadvantages of the known methods can be avoided in the process of the present invention.

This invention provides a process for the manufacture of electrophotographic material that is permanently insensitive to moisture, by coating a support with a resin layer containing a photoconductor and fixing the resin layer, wherein to an aqueous preparation obtained by dissolving in water a salt of a copolymer containing carboxyl groups and a volatile nitrogen base, a photoconductor is added and the mixture reacted and with a compound of hexavalent chromium, the preparation applied to a support and the support thus treated is dried.

In the present process the usual supports or bases may be used, for example, films or especially paper.

The resins required for the process contain, as groups imparting solubility in water, carboxylic acid groups. As will be realized from the foregoing, the polymers must, insofar as the degree of polymerization and the number of solubilizing groups are concerned, be such that they are soluble in water at least in the form of salts of volatile nitrogen bases. In general, this is the case when the copolymer in the form of the free acid has an acid number from 80 to 400 (the term "acid number" designates, as is usual, the milligrams of KOH needed to neutralize 1 gram of the copolymer). If the acid number is too low, the copolymer is not soluble in an acidic medium, if it is too high it is very difficult to render the copolymer insoluble.

As a rule, the copolymers required in the present process are manufactured by polymerizing a polymerizable carboxylic acid with at least one polymerizable monomer that is free from carboxylic acid groups. Suitable monomers are the known ethylenically unsaturated compounds, for example, acrylic acid esters, especially vinyl esters of lower carboxylic acids, e.g. vinyl acetate, vinyl chloride or styrene. From among the polymerizable carboxylic acids there may be mentioned crotonic, methacrylic and chloracrylic acid, above all acrylic and maleic acid. Particularly suitable are copolymers from vinyl acetate and maleic acid. There may be specially mentioned those copolymers of this type which have a molecular weight of about 40,000, and a molecular ratio of maleic acid:vinyl acetate of at least 1:4. Such products can be swelled in water; they form salts with the readily volatile bases which are readily soluble.

The volatile nitrogen base used is, for example, a base containing a single nitrogen atom, above all ammonia. Further suitable are lower momoamines, for example, methylamine or ethylamine. In some cases, there may also be used tertiary volatile amines for example trimethylamine.

As photoconductors preferably used in the present process, there may be mentioned inorganic photoconductors, for example, the oxides of antimony, aluminum, bismuth, cadmium, mercury, molybdenum or lead. It is preferable to use zinc oxide; for the manufacture of high-grade layers, the zinc oxide used should be of maximum purity and is advantageously the product obtained by the so-called French process, that is to say by atmospheric oxidation of zinc vapours. In all cases, the photoconductor requires to be sufficientiy finely dispersed, preferably having a particle size smaller than 1μ.

In the present process, it is also necessary to use a compound of hexavalent chromium. Its action renders the electrophotographic layer substantially and permanently insensitive to moisture. Suitable compounds of hexavalent chromium are for example, chromic acid (CrO₃), alkali metal chromates and preferably alkali metal bichromates, for example, sodium or potassium bichromate, or ammonium bichromate.

If desired, further additives may be incorporated with the electrophotographic layer. Inter alia, the following elements or their compounds, advantageously in an amount of 0.1% to 5%, referred to the weight of the photoconductor, may be added; boron, thallium, lithium, lead, cobalt and/or silver. These substances may be incorporated with the zinc oxide in known manner by migration at 400 to 600° C., or they may be added to the mixture in the form of salt solutions. Such additions may produce favorable effects: inter alia, the speed of the photoconductor layer may be increased, the velocity of charging may be raised, the distribution of the charge and with it the definition improved and/or the contrast effect may be controlled. It is also possible to add color sensitizers to increase the photoconductivity of the layer for the visible region of light.

The substances required for carrying out this process may be used in proportions varying within relatively wide limits. Thus, for example, 5 to 20% of copolymer, referred to the weight of photoconductor, are used. The amount of water is advantageously chosen so that the substances to be dissolved in water dissolve readily and completely and, at the same time the resulting mixture has a consistency adequate for coating the support. It may be, for example, 1 to 10 times the amount of copolymer. The amount of volatile amine added should be such that the copolymer dissolved substantially completely. In general, it is advantageous to use so much of the volatile base that for every acid equivalent 1 to 2 base equivalents are present. The amount of hexavalent chromium compound, referred to 100 parts of copolymer and calculated as chromium trioxide, is within the range, for example, from 0.02 to 4, advantageously from 0.06 to 0.4, part.

In other respects the present process may be carried out in known manner, preferably by dissolving the polymer containing acid groups imparting solubility in water, in the presence of the volatile nitrogen base, in water, finely dispersing the photoconductor in the solution, adding an aqueous solution of a compound of hexavalent chromium, immediately afterwards applying the aqueous preparation obtained in this manner to the support and drying the layer on it.

The contrast effect of the images obtained on the material manufactured by the present invention can be controlled by modifying the proportions of photoconductor and copolymer, for example within the limits indicated above. The contrasts can also be increased or weakened by varying the exposure time.

In general it is advantageous to coat the support on both sides. In this manner the mechanical properties of the material in comparison with those of a unilaterally coated material can be significantly improved, and above all its curling tendency can be reduced. Moreover, by bilateral coating, using a lesser total layer thickness, a better, that is to say faster, electrophotographic material is obtained. The total layer thickness should, however, in the case of unilaterally or bilaterally coated material, be not less than 10μ. On the other hand, the total layer thickness should as a rule not exceed 40μ. The temperature at which the coated material is dried should advantageously be within the range from 100 to 130° C., and the time for which it is heated at this temperature should be from 1 to 10 minutes.

Images can be produced in known manner on the electrophotographic material obtained by the present process. As is usual, the material is negatively charged, advantageously by a corona discharge, and then exposed under a master in contact or in an enlarging apparatus, whereupon the image is rendered visible and fixed, for example as indicated above.

The image may be rendered visible or developed, for example, with a colored powder capable of carrying a positive or negative charge and a vehicle. If the development is carried out with a magnet brush, iron filings are a suitable vehicle.

Provided the colored powder has a suitable melting point, for example, within the range of from 60 to 120° C., it can be fixed on the support simply by heating.

For the manufacture of meltable developer powders there are a large number of resins available. Good results can be achieved with polyvinyl acetate. It is advantageous to choose a polyvinyl acetate that melts between 60 to 90° C. The polyvinyl acetate is easy to dye a variety of shades. This enables very dark tints to be obtained without the aid of pigments such as lampblack, and the electrophotographic images obtained in this manner have no tendency to give off the dyestuff and they are found to be particularly fast to abrasion. Furthermore, the colored powders can be selected somewhat freely, irrespective of whether a positively or negatively charged developer is required, since in such a case a material having the desired charge can be incorporated. Finally, the resins are substantially colorless so that they can be used to produce transparent dyeings, which is an essential condition for the development in various colors.

The following examples illustrate the invention, the parts and percentages being by weight unless otherwise indicated:

EXAMPLE 1

10 parts of a commercial copolymer from vinyl acetate and maleic acid in the ratio of 2.4:1 [for example, the product marketed under the trademark Nitromul], having an acid number of 5, are dissolved with 2 parts of 1.5 N-ammonia in 150 parts of distilled water. 100 parts of zinc oxide obtained by oxidizing zinc vapour are dispersed in this solution, whereupon 0.5 part by volume of 10% aqueous solution of ammonium bichromate are added, and immediately thereupon a paper that is only slightly sensitive to water and weighs 75 g. per square meter is coated with the dispersion thus prepared, the thickness of the coating being such that the zinc oxide content is 20 g. per square meter of paper. The coated paper is dried at 110° C. The resulting layer is insensitive to water. On this material, an image can be produced by a negative charge under a device for corona discharges of 10 kilovolts, exposure under a master and development in the dark with a usual electrostatic powder.

EXAMPLE 2

10 parts of a polymer from vinyl acetate and acrylic acid in the ratio of 5.6:1, having an acid number of 100 [for example the product marketed under the trademark X 209 A] are stirred in 5 parts of methanol. There are then added successively 90 parts of water, 25 parts by volume of normal ammonia and 90 parts of zinc oxide, and the whole is stirred until it forms a homogeneous dispersion. For sensitizing the mixture to visible light, 0.005 part of Bengal Pink [Schultz, Dyestuff Tables, 7th edition, No. 889] is added. Immediately before coating, 3 parts by volume of a 1% aqueous solution of ammonium bichromate are added to the mixture. The resulting dispersion is used for coating a paper suitable for diazotypes, weighing 56 g. per square meter, the coating weight being 30 g. per square meter. The coated paper is dried, advantageously with the aid of an infrared dryer, and heated for 10 minutes at 110° C. On this paper, images can be produced as described in Example 1.

EXAMPLE 3

The method described in Example 2 is adopted, except that the copolymer from vinyl acetate and acrylic acid is replaced by a copolymer from styrene and acrylic acid in the ratio of 3:2. The layer produced in this manner is very soft and can be used for the production of electrophotographic images.

EXAMPLE 4

In the production of electrophotographic material according to Example 2, ammonium bichromate is replaced by 2 parts by volume of a 1% aqueous solution of chromic acid ($CrO_3$). This material, which is likewise insensitive to water, is equally suitable for the production of electrophotographic images, as is also the case when ammonium bichromate is replaced by potassium bichromate.

EXAMPLE 5

The method described in Example 2 is used, except that the ammonia solution is replaced by an N-aqueous ethylamine solution. After the material has been dried and heated, it is likewise completely insensitive to water.

What is claimed is:

1. A process for the manufacture of an electrophotographic material, insensitive to water, which comprises applying to a film or a paper an aqueous preparation, obtained by dissolving in 1 to 10 parts by weight of water 1 part of a salt of a copolymer formed by polymerization of (a) a member selected from the group consisting of acrylic acid esters, vinyl esters of lower carboxylic acids and styrene, and (b) a member selected from the group consisting of crotonic, methacrylic, chloracrylic, acrylic and maleic acid the molecular ratio of (a):(b) being from 5.6:1 to 3:2 and a volatile nitrogen base, adding to photoconductor, such that 5 to 20% by weight of copolymer, referred to the weight of photoconductor are present, and reacting the resulting mixture with a compound of hexavalent chromium, and then drying the coating.

2. A process for the manufacture of an electrophotographic material, according to claim 1, which comprises using zinc oxide as a photoconductor.

3. A process for the manufacture of an electrophotographic material, according to claim 2, which comprises using ammonia as a volatile nitrogen base.

4. A process for the manufacture of an electrophotographic material, according to claim 3, which comprises using a water-soluble bichromate as a compound of hexavalent chromium.

5. A process for the manufacture of an electrophotographic material according to claim 4 wherein the copolymer is vinyl acetate and maleic acid, in the ratio of 2.4:1, and the water-soluble bichromate is ammonium bichromate.

6. A process for the manufacture of an electrophotographic material according to claim 4 wherein the copolymer is vinyl acetate and acrylic acid, in the ratio of 5.6:1, having an acid number of 100, and the water-soluble bichromate is ammonium bichromate.

7. A process for the manufacture of an electrophotographic material according to claim 4 wherein the copolymer is styrene and acrylic acid, in the ratio of 3:2, and the water-soluble bichromate is ammonium bichromate.

8. A process for the manufacture of an electrophotographic material, according to claim 3, which comprises coating the aqueous preparation to a paper using as a copolymer salt, a salt of a copolymer, formed by polymerization of vinyl acetate and acrylic acid in the ratio of 5.6:1, having an acid number of 100, an ammonia, and as a compound of hexavalent chromium an aqueous solution of chromic acid ($CrO_3$).

References Cited

UNITED STATES PATENTS

| | | | |
|---|---|---|---|
| 2,875,054 | 2/1959 | Griggs et al. | 117—34 X |
| 3,102,030 | 8/1963 | Hoerner | 117—34 X |
| 3,128,204 | 4/1964 | Schaum et al. | 117—34 X |
| 3,160,503 | 12/1964 | Cady | 117—34 X |
| 3,189,450 | 6/1965 | Kocsuta | 117—34 X |
| 3,245,786 | 4/1966 | Cassiers et al. | 96—1.8 |
| 3,261,709 | 7/1966 | Shulman | 117—34 |

WILLIAM D. MARTIN, *Primary Examiner.*

EDWARD J. CABIC, *Assistant Examiner.*

U.S. Cl. X.R.

96—1.8

CASE SL-6/E

PO-1050
(5/69)

UNITED STATES PATENT OFFICE
CERTIFICATE OF CORRECTION

Patent No. 3,454,415           Dated July 8, 1969

Inventor(s) GEORGES AUGUSTE BONJOUR

It is certified that error appears in the above-identified patent and that said Letters Patent are hereby corrected as shown below:

Column 5, line 20, after "adding" delete "to" and substitute --- a ---.

SIGNED AND
SEALED
DEC 8 1970

(SEAL)
Attest:

Edward M. Fletcher, Jr.
Attesting Officer

WILLIAM E. SCHUYLER, JR
Commissioner of Patents